(12) United States Patent
Onoe

(10) Patent No.: US 6,755,114 B2
(45) Date of Patent: Jun. 29, 2004

(54) AIR PULSER AND DEVICES

(75) Inventor: Masao Onoe, Mie (JP)

(73) Assignee: Kanekita Co., Ltd., Osaka (JP)

(*) Notice: Subject to any disclaimer, the term of this patent is extended or adjusted under 35 U.S.C. 154(b) by 0 days.

(21) Appl. No.: 10/194,236

(22) Filed: Jul. 15, 2002

(65) Prior Publication Data

US 2003/0017012 A1 Jan. 23, 2003

(30) Foreign Application Priority Data

Jul. 23, 2001 (JP) ........................................ 2001-221597

(51) Int. Cl.[7] .............................................. F01L 25/08
(52) U.S. Cl. ............................ 91/275; 92/218; 251/65
(58) Field of Search ............................. 91/275; 92/218; 251/65; 406/198

(56) References Cited

U.S. PATENT DOCUMENTS

| | | | |
|---|---|---|---|
| 4,148,336 A | | 4/1979 | Leinemann |
| 4,819,682 A | * | 4/1989 | Van Marcke ................. 137/1 |
| 4,934,651 A | * | 6/1990 | Nowicki ..................... 251/54 |
| 4,974,494 A | * | 12/1990 | Kroger ........................ 91/433 |
| 4,996,907 A | | 3/1991 | Kroger |
| 5,169,117 A | * | 12/1992 | Huang ..................... 251/30.03 |
| 5,375,811 A | * | 12/1994 | Reinicke ................ 251/129.16 |
| 5,381,606 A | | 1/1995 | Solimar |
| 5,535,777 A | * | 7/1996 | Maracchi ................... 137/458 |
| 5,758,863 A | * | 6/1998 | Buffet et al. ................. 251/28 |

FOREIGN PATENT DOCUMENTS

| | | |
|---|---|---|
| EP | 0 021 999 | 1/1981 |
| EP | 0 811 795 | 12/1997 |
| GB | 2 302 535 | 1/1997 |
| JP | 5-330652 | 12/1993 |
| JP | 6-30735 | 4/1994 |

OTHER PUBLICATIONS

Patent Abstracts of Japan, vol. 18, No. 160, Mar. 17, 1994 & JP 05 330652 A, Hitachi Plant Eng & Constr Co., Ltd., Dec. 14, 1993.

* cited by examiner

*Primary Examiner*—Joseph A. Dillon
(74) *Attorney, Agent, or Firm*—Wenderoth, Lind & Ponack, L.L.P.

(57) ABSTRACT

An air pulser is provided which can intermittently form pulse air by continuously supplying compressed air. The interior of the body is partitioned into an air supply chamber and an air exhaust chamber by a diaphragm. An air blast cylinder opened and closed by the diaphragm is provided in the air supply chamber. In the air exhaust chamber, a valve plate having a valve hole and comprising a magnetic member is provided to partition it into a first chamber and a second chamber. A valve body with a permanent magnet is movably mounted in the second chamber. Compressed air can be continuously fed into the air supply chamber to open the valve body due to an increase in pressure in the first chamber, thereby exhausting compressed air in the air exhaust chamber through an air exhaust port, and to deform the diaphragm toward the air exhaust chamber due to a drop in pressure in the air exhaust chamber, thereby discharging compressed air in the air supply chamber through the air blast cylinder.

2 Claims, 9 Drawing Sheets

AIR PULSER AND DEVICES

BACKGROUND OF THE INVENTION

This invention relates to an air pulser for blasting pulse air, and a powder transporting nozzle, a powder supply device, an air knocker and a bridge breaker using the air pulser.

Heretofore, it is ordinarily done to carry powder and granular material by air or destroy bridges of powder and granular material filled in a hopper by intermittently blasted compressed air or so-called pulse air.

For example, in a transporting device for powder and granular material described in JP patent publication 5-330652, a compressed air supply source comprising a compressor and a pressurized tank are brought into communication with each other through a first passage, and a transporting pipe for powder and granular material connected to a lower outlet of the pressurized tank and the compressed air supply source are brought into communication with each other through a second passage. An electromagnetic valve is connected to each of the first and second passages to control the opening and closing of the respective electromagnetic valves to alternately supply pulse air into the pressurized tank and the transporting pipe, thereby fluidizing the powder and granular material by pulse air supplied into the pressurized tank to suppress the formation of bridges. Also, by pulse air supplied into the transporting pipe, the powder and granular material discharged from the pressurizing tank into the transporting pipe is air-carried.

Also, in the air vibrator described in JP patent publication 6-30735, a valve chamber is provided above a cylinder, a diaphragm having a small hole is stretched in the valve chamber to partition the valve chamber into an upper chamber and a lower chamber into which compressed air is supplied, and an electromagnetic valve is connected to an air exhaust port formed in the peripheral wall of the upper chamber. Opening and closing of the electromagnetic valve is controlled to exhaust compressed air in the upper chamber by opening the electromagnetic valve, and open the top end of the cylinder by deflecting the diaphragm toward the upper chamber as the pressure in the upper chamber lowers, thereby lowering a piston mounted in the cylinder by pulse air supplied from the lower chamber into the cylinder to strike a striking plate with the piston.

In such a powder transporting device or an air vibrator, there are problems that an electromagnetic valve is required to form pulse air. Thus the device tends to be large, and the cost is high since it is necessary to control the opening and closing of the electromagnetic valve with a control device.

An object of this invention is to provide an air pulser which can blast pulse air only by continuously supplying compressed air without using an electromagnetic valve. Another object is to provide a powder transporting nozzle and a powder supply device which use the air pulser, and an air knocker and a bridge breaker capable of intermittently imparting striking force.

SUMMARY OF THE INVENTION

According to this invention, there is provided an air pulser comprising a body having an inner space, a diaphragm having a small hole and stretched in the inner space of the body to partition the inner space into an air supply chamber and an air exhaust chamber, the diaphragm being imparted with an elastic force so as to be normally deformed toward the air supply chamber, an air blast cylinder provided in the air supply chamber and closed by the diaphragm and communicating with the air supply chamber when in its open state, a valve plate provided in the air exhaust chamber to partition the air exhaust chamber into a first chamber and a second chamber, the valve plate being formed with a valve hole, a valve body provided in the second chamber to control the opening of the valve hole, and a permanent magnet provided in the second chamber to support the valve body so as to be movable relative to the valve plate and hold the valve body in a closed state by attracting the valve plate to the valve body by a magnetic force, the body being formed with an air supply port for supplying compressed air into the air supply chamber and an air exhaust port for exhausting air in the second chamber to outside.

In the air pulser having such a structure, when compressed air is supplied into the air supply chamber through the air supply port, it flows through the small hole formed in the diaphragm into the first chamber of the air exhaust chamber. When the pressure in the first chamber overcomes the attracting force of the permanent magnet, the valve body retreats to open the valve hole, so that compressed air in the first chamber flows through the valve hole into the second chamber and is discharged to outside. The pressure in the air exhaust chamber will drop below the pressure in the air supply chamber, so that the diaphragm is deformed toward the air exhaust chamber, thus opening the air inlet of the air blast cylinder. Thus, compressed air in the air supply chamber flows into the air blast cylinder and is blasted therefrom.

Also, when the pressure in the air exhaust chamber is kept substantially at the atmospheric pressure, the attracting force acting between the permanent magnet and the valve plate returns the valve body to a state in which it closes the valve hole. After the valve body has been closed, the diaphragm is deformed toward the air supply chamber to close the air inlet of the air blast cylinder and shut off flow of compressed air from the air supply chamber to the air blast cylinder.

The valve body opens every time the pressure in the first chamber increases. Every time the valve body opens, the diaphragm is deformed toward the air exhaust chamber to open the air inlet of the air blast cylinder. Thus it is possible to intermittently blast pulse air.

The powder transporting nozzle according to this invention comprises a nozzle body formed with a suction passage and a discharge passage communicating with the suction passage, and an air pulse generating unit for blasting pulse air toward the discharge passage. The air pulse generating unit has the same structure as the air pulser according to the present invention. The air blast cylinder is arranged to oppose the air inlet end of the discharge passage.

With this arrangement, pulse air is intermittently blasted into the discharge passage from the air pulse generating unit, and every time air is blasted, a negative pressure is produced in the suction passage.

Thus, by connecting a hose to an end of the suction passage and inserting the tip of the hose into powder and granular material in the open-topped container, it is possible to suck up powder and granular material in the container into the suction passage and discharge it through the discharge passage.

The powder supply device according to this invention comprises a diffuser for discharging powder and granular material, an air pulser for blasting pulse air toward the inlet of the diffuser, and a hopper for storing powder and granular material. The hopper has its outlet at its bottom protruding into a mixing space formed between the air pulser and the diffuser. The air pulser has the same structure as the air pulser of the first invention. The air pulser has its air blast cylinder arranged so as to oppose the material inlet of the diffuser.

With this arrangement, pulse air is intermittently blasted from the air pulser into the diffuser, and every time air is blasted, it is possible to feed powder and granular material from the hopper into the diffuser, and intermittently discharge powder and granular material through the diffuser.

The air knocker according to this invention comprises a cylinder, a piston and a return spring mounted in the cylinder, the return spring biasing the piston in a direction away from a striking plate mounted to the tip of a cylinder. An air pulser for blasting pulse air into the cylinder is provided at the rear end of the cylinder. The air pulser has the same structure as the air pulser according to the first invention. The air pulser has its air blast cylinder integral with one end of the cylinder.

With this arrangement, since pulse air is intermittently blasted into the cylinder from the air pulser, every time air is blasted, it is possible to advance the piston and intermittently strike the striking plate with the piston.

Thus, by mounting the striking plate to the hopper, it is possible to intermittently impart vibrations to the hopper. Thus it is possible to suppress formation of bridges in powder and granular material filling the hopper. Also, if bridges should be formed, it is possible to destroy the bridges.

The bridge breaker according to the present invention comprises a storage tank, an air nozzle mounted so as to extend through a peripheral wall of the storage tank for storing powder and granular material, an umbrella-like elastic member mounted to a tip of the air nozzle disposed in the storage tank and having its outer peripheral edge in elastic contact with the inner surface of the storage tank to form a space inside the elastic member. The air nozzle is formed with an air passage communicating with the space, and an air pulser connected to the rear end of the air nozzle for blasting pulse air into the air passage. The air pulser has the same structure as the air nozzle according to the first invention. The air nozzle is connected to the air blast cylinder of the air pulser.

With this arrangement, pulse air is intermittently blasted from the air pulser into the air nozzle, and through the nozzle into a space formed between the elastic member and the inner surface of the storage tank. Every time air is blasted, the pressure in the space rises so that the elastic member is elastically deformed in such a way as to be flattened. Due to such deformation, a gap is formed between the elastic member and the inner surface of the peripheral wall of the storage tank, so that air in the space is blasted through the gap into the storage tank. Thus, the powder and granular material filling the storage tank fluidizes, so that if bridges are formed, they are destroyed.

The bridge breaker according to this invention comprises a storage tank, an elastically deformable elastic sheet provided on the inner surface of the storage tank to form a sealed gap inside of the elastic sheet, and an air pulser connected to the rear end of a nozzle cylinder extending through the storage tank and having its tip positioned in the sealed gap for blasting pulse air into the nozzle cylinder. The air pulser has the same structure as the air pulser according to the first invention. The nozzle cylinder is connected to the air blast cylinder of the air pulser.

With this arrangement, when pulse air is intermittently blasted into the nozzle cylinder from the air pulser, the pulse air is fed into the sealed space, so that the elastic sheet inflates in the storage tank, thereby pressing the powder and granular material filling the storage tank. Thus, if bridges are formed, they will be destroyed.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
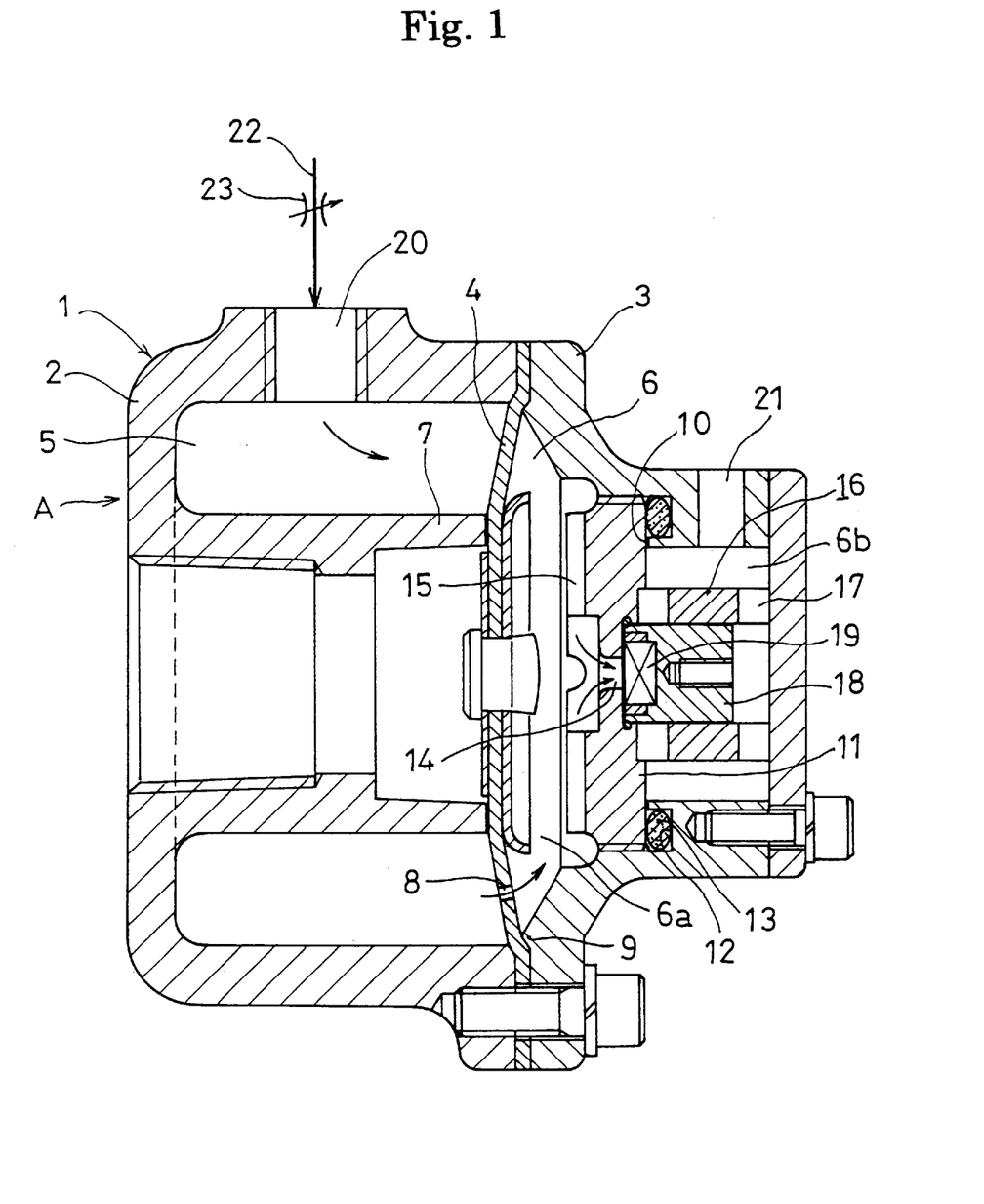
FIG. 1 is a vertical sectional front view showing a first embodiment of the air pulser according to this invention.
Figure 2:
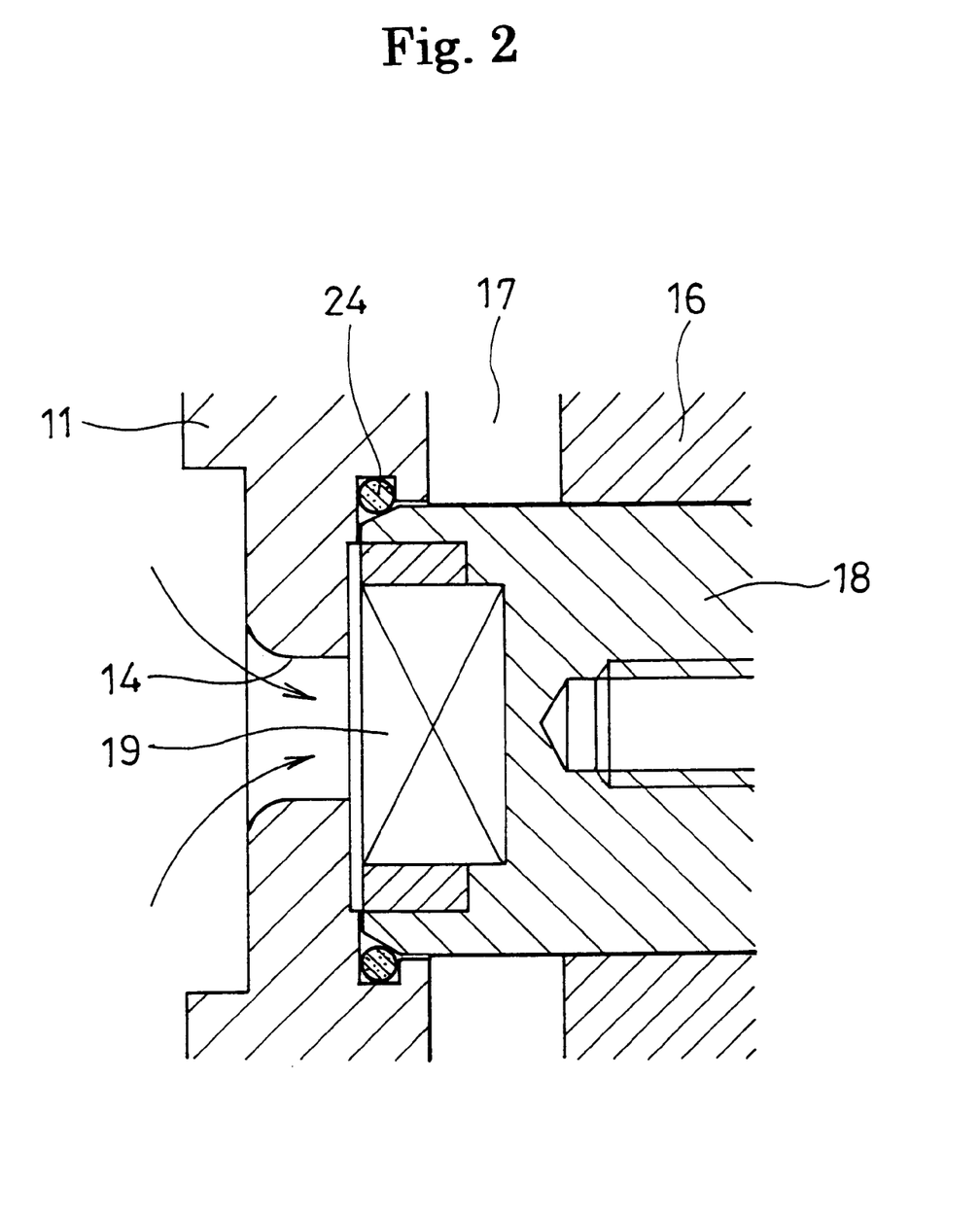
FIG. 2 is a sectional view of the valve body portion of the air pulser of FIG. 1 on an enlarged scale.
Figure 3:
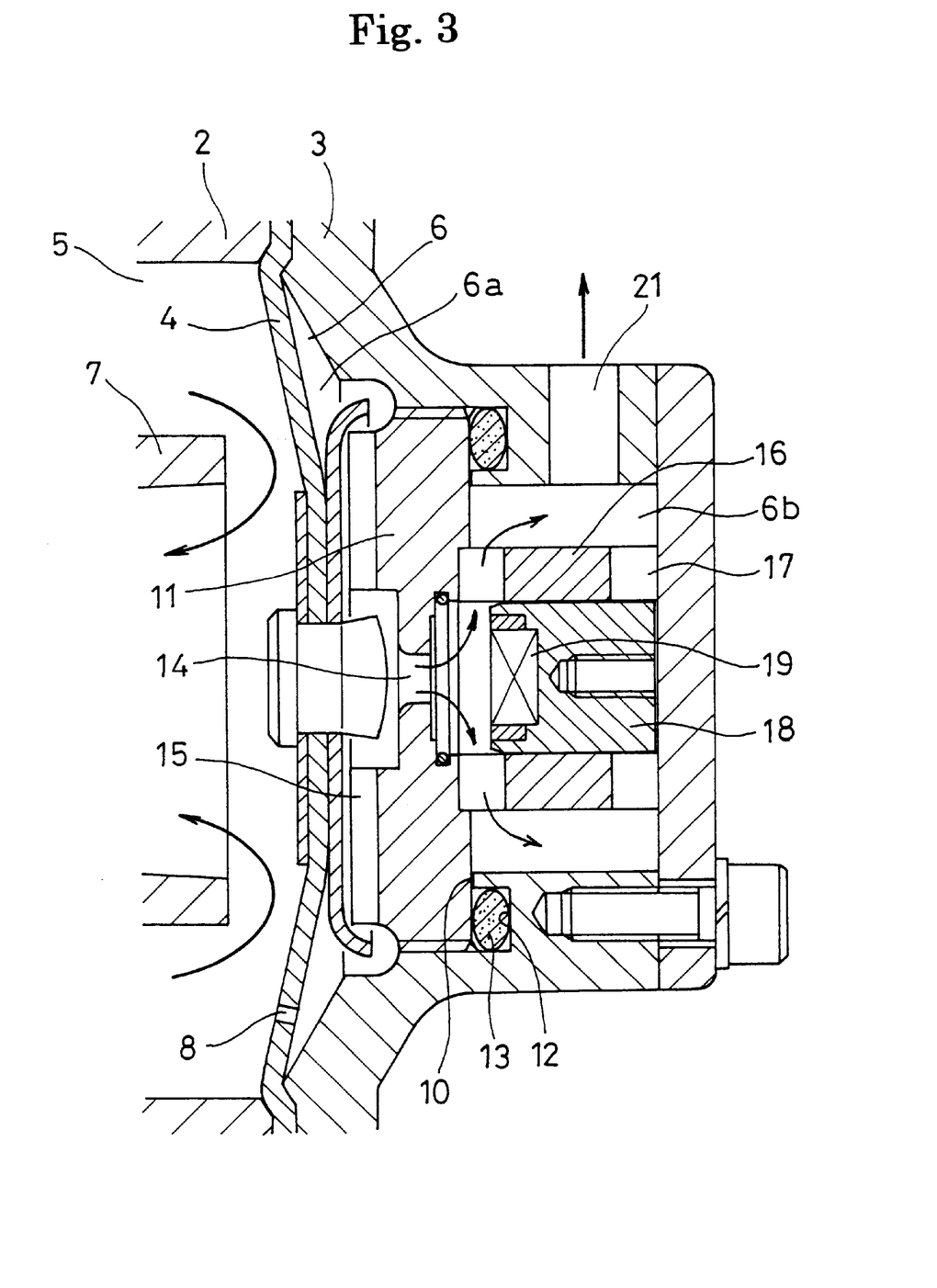
FIG. 3 is a sectional view of the valve body of the air pulser of FIG. 1 in an open state.

Hereinbelow, the embodiments of this invention will be described with reference to the drawings. FIGS. 1–3 show the first embodiment of the air pulser according to this invention. As shown in FIGS. 1 and 2, a body 1 comprises a cylindrical body main portion 2 and and a head cover 3 bolted to one end of the body main portion 2. A diaphragm 4 has its outer peripheral portion clamped between the body main portion 2 and the head cover 3.

The inner space of the body 1 is partitioned into an air supply chamber 5 and an air exhaust chamber 6 by the diaphragm 4. An air blast cylinder 7 is provided in the air supply chamber 5.

The diaphragm 4 is formed with a small hole 8 through which the air supply chamber 5 and the air exhaust chamber 6 communicate with each other. The diaphragm 4 is biased toward the air supply chamber 5 by an annular protrusion 9 provided on the outer periphery of the end face of the head cover 3 that opposes the body main portion 2. The air inlet of the air blast cylinder 7 is closed by the diaphragm 4. The diaphragm 4 may be biased toward the air supply chamber 5 by a spring.

A shoulder 10 is provided on the inner periphery of the head cover 3. A valve plate 11 in threaded engagement with the inner periphery of the head cover 3 is supported by the shoulder 10. The valve plate 11 partitions the air exhaust chamber 6 into a first chamber 6a and a second chamber 6b.

An annular groove 12 is formed in the shoulder 10. An elastic seal 13 mounted in the annular groove 12 seals abutment surfaces between the shoulder 10 and the valve plate 11.

The valve plate 11 is made of a magnetic material which a permanent magnet can attract. The valve plate 11 is formed with a valve hole 14 through which the first chamber 6a and the second chamber 6b communicate with each other. Also, the valve plate 11 is formed with radial grooves 15 in its end face opposing the first chamber 6a.

In the second chamber 6b, a guide cylinder 16 is mounted coaxially with the valve hole 14. The guide cylinder 6 has vent holes 17 at both ends, and a valve body 18 for opening and closing the valve hole 14 is slidably mounted in the guide cylinder 16.

In the end face of the valve body 18 opposing the valve plate 11, a permanent magnet 19 is buried. It is detachable and exchangeable with another magnet having a different magnetic force.

The body 1 is formed with an air supply port 20 communicating with the air supply chamber 5 and an air exhaust port 21 communicating with the second chamber 6b. In an air supply passage 22 connected to the air supply port 20, a variable throttle 23 is mounted.

In FIG. 2, a seal member 24 is provided to seal between the valve body 18 and the valve plate 11 when the valve body 18 is in its closed state.

The air pulser of this embodiment has the abovesaid structure. While supply of air to the air supply port 20 is stopped, the valve body 18 is retained in its closed state with the valve plate 11 attracted by the permanent magnet 19. The diaphragm 4 keeps the air inlet of the air blast cylinder 7 closed.

When compressed air is supplied to the air supply port 20 through the air supply passage 22, it flows into the air supply chamber 5 and then through the small hole 8 of the diaphragm 4 into the first chamber 6a of the air exhaust chamber 6.

The pressure in the first chamber 6a will gradually increase as compressed air flows in. When the pressure increases and overcomes the attracting force with which the permanent magnet 19 attracts the valve plate 11, the valve body 18 will retreat to open the valve hole 14.

When the valve hole 14 opens, compressed air in the first chamber 6a flows through the valve hole 14 into the second chamber 6b and is discharged to outside through the air exhaust port 21. As it is discharged, the pressure in the air exhaust chamber 6 drops. Due to a pressure difference between the air supply chamber 5 and the air exhaust chamber 6, the diaphragm 4 is elastically deformed toward the air exhaust chamber 6 as shown in FIG. 3, so that the air inlet of the air blast cylinder 7 opens.

Thus, compressed air in the air supply chamber 5 flows into the air blast cylinder 7 and is blasted from it.

On the other hand, when compressed air in the air exhaust chamber 6 is discharged through the air exhaust port 21 and the pressure in the air exhaust chamber 6 drops, attracting force of the permanent magnet 19 acting on the valve plate 11 causes the valve body 18 to advance to close the valve hole 14. When it is closed, compressed air in the air supply chamber 5 flows through the small hole 8 of the diaphragm 4 into the first chamber 6a of the air exhaust chamber 6, so that the pressure in the first chamber 6a increases. When the pressure in the first chamber 6a becomes substantially equal to the pressure in the air supply chamber 5, the diaphragm 4 is elastically deformed toward the air supply chamber 5 to close the air inlet of the air blast cylinder 7. Blasting of air from the air blast cylinder 7 thus stops.

The valve body 18 opens the valve hole 14 when the pressure in the first chamber 6a exceeds the attracting force of the permanent magnet 19 and closes it when compressed air in the air exhaust chamber 6 is exhausted through the air exhaust port 21 and the pressure in the air exhaust chamber 6 drops. On the other hand, the diaphragm 4 opens the air inlet of the air blast cylinder 7 when the pressure in the air exhaust chamber 6 drops, and closes it when the valve body 18 closes the valve hole 14 and the pressure in the first chamber 6a becomes substantially equal to the pressure in the air supply chamber 5. Thus it is possible to intermittently blast pulse air through the air blast cylinder 7. Thus it is possible to form air pulses without using an electromagnetic valve.

By adjusting the amount of compressed air supplied to the air supply port 20 by operating the variable throttle 23 provided in the air supply passage 22, it is possible to adjust intervals of pulse air blown from the air blast cylinder 7.

Also, by replacing the permanent magnet 19, which is buried in the valve body 18, with one having a different attracting force, the pressure at which the valve body 18 opens changes. Thus it is possible to change the pressure of pulse air blasted through the air blast cylinder 7.

Figure 4:
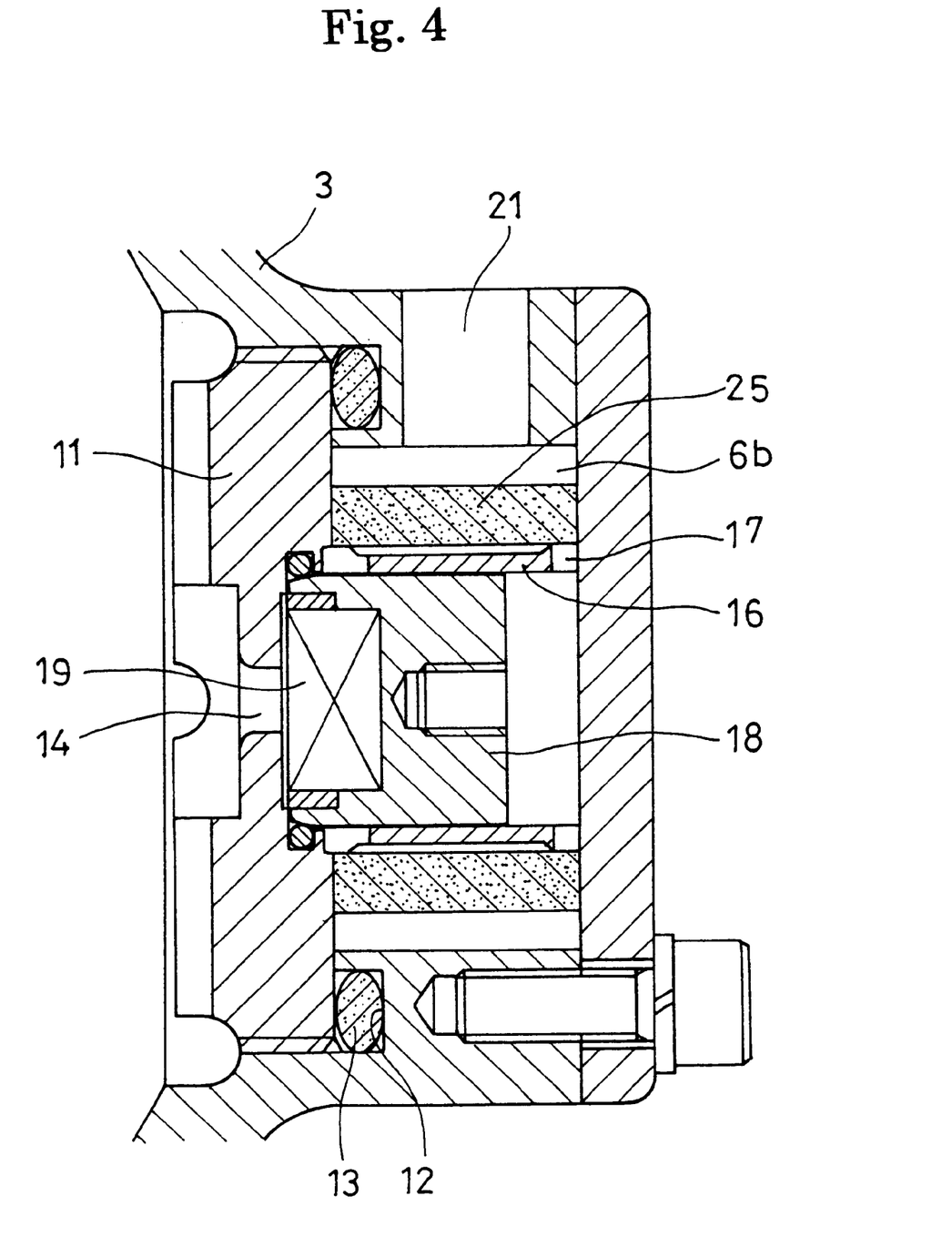
FIG. 4 is a sectional view of a second embodiment of the air pulser according to this invention.

FIG. 4 shows the second embodiment of the air pulser according to this invention. It differs from the first embodiment in that a porous cylindrical member 25 is mounted around the guide cylinder 16. In this embodiment, since compressed air in the second chamber 6a flows from inside to outside of the cylindrical member 25 and is discharged through the air exhaust port 21, it is possible to suppress generation of exhaust sound.

Figure 5:
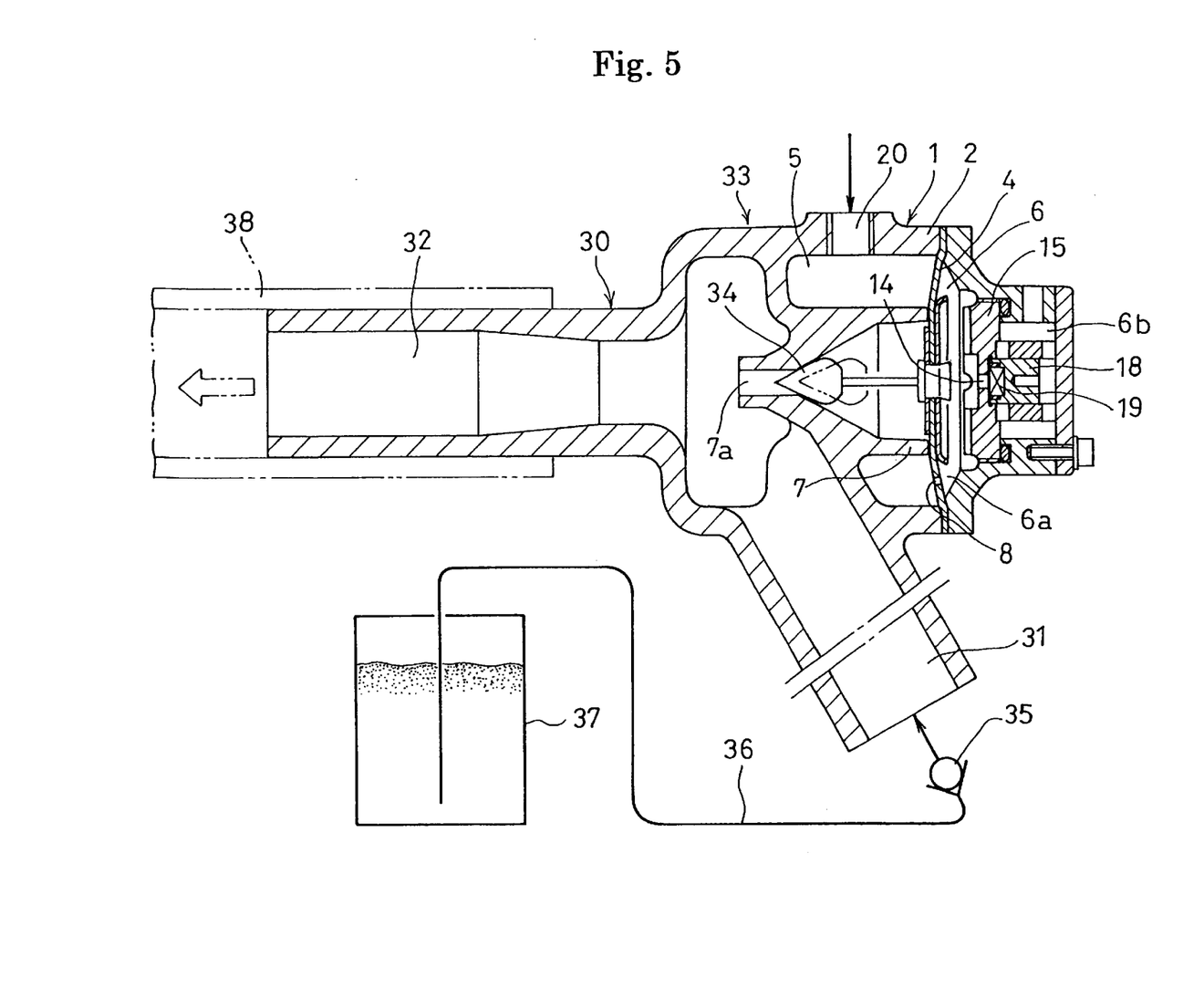
FIG. 5 is a vertical sectional front view of the powder transporting nozzle according to this invention.

FIG. 5 shows an embodiment of a powder transport nozzle according to this invention. It is provided with a suction passage 31 in the nozzle body 30, a discharge passage 32 communicating with the suction passage 31, and an air pulse generating portion 33 for blasting pulse air toward the discharge passage 32.

The air pulse generating portion 33 has a body 1 integral with the nozzle body 30. It differs from the air pulser A shown in FIG. 1 in the shape of the body 1 and in that a small-diameter nozzle hole 7a is formed in the tip of the air blast cylinder 7 and a needle valve 34 for opening and closing the nozzle hole 7a is connected to the diaphragm 4. Thus, to the same parts as those of the air pulse A shown in FIG. 1, the same numerals are attached and their description is omitted.

The needle valve 34 is adapted to open the nozzle hole 7a when the diaphragm 4 is elastically deformed toward the air exhaust chamber 6 and opens the air inlet of the air blast cylinder 7.

The air pulse generating portion 33 is arranged such that the tip of the air blast cylinder 7 opposes the air supply end of the discharge passage 32.

In the powder transport nozzle having the abovesaid structure, each time pulse air is intermittently blasted into the discharge passage 32 from the air pulse generating portion 33, a negative pressure is produced in the suction passage 31.

By connecting a hose 36 to the suction passage 31 through a check valve 35 and inserting the tip of the hose 36 into powder or granular material in a powder/granular material container 37 and connecting a transport hose 38 to the discharge passage 32, it is possible to suck powder or granular material into the suction passage 31 and carry the sucked material by air through the hose 38 from the discharge passage 32.

Since the air pulse generating portion 33 for intermittently blasting air pulses needs no electromagnetic valve, it is possible to obtain a powder-transport nozzle that is simple in structure and inexpensive.

Figure 6:
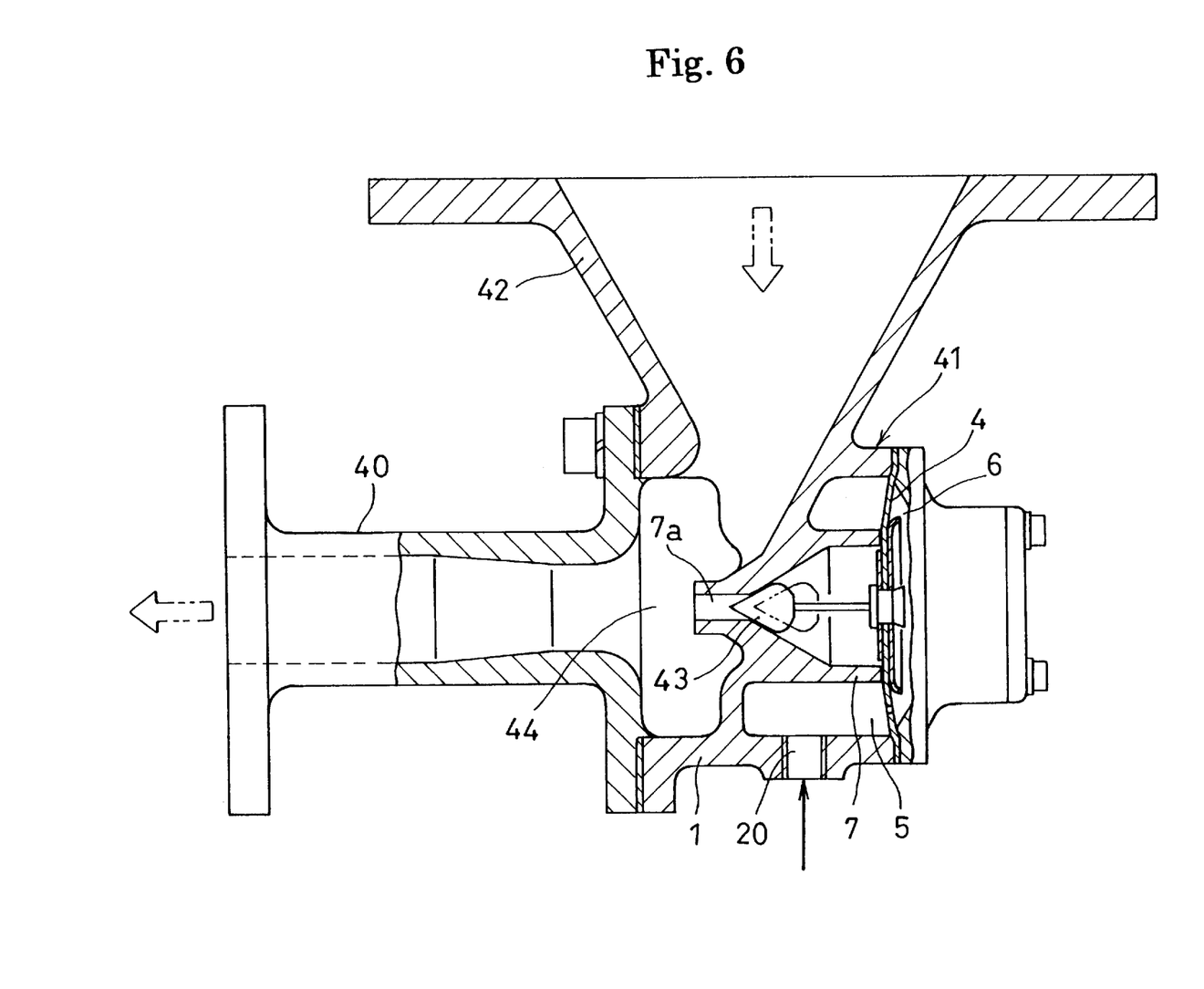
FIG. 6 is a partially cutaway front view of the powder supply device according to this invention.

FIG. 6 shows one embodiment of the powder and granular material supply device according to this invention. It comprises a diffuser 40 for discharging powder or granular material, an air pulser 41 for blasting pulse air toward the powder/granular material inlet of the diffuser 40, and a hopper 42 through which powder/granular material is supplied.

The air pulser 41 differs from the air pulser A shown in FIG. 1 in the shape of the body 1 and in that a nozzle hole 7a is formed in the tip of the air blast cylinder 7 and a needle valve 43 for opening and closing the nozzle hole 7a is connected to the diaphragm 4. When the diaphragm 4 is elastically deformed toward the air exhaust chamber 6, thus opening the air inlet of the air blast cylinder 7, the needle valve 43 is adapted to open the nozzle hole 7a.

The body 1 of the air pulser 41 is connected to the rear end of the diffuser 40 and the tip of the air blast cylinder 7 is spaced from and opposed to the powder/granular material inlet of the diffuser 40.

The hopper 42 is integrated with the outer periphery of the body 1 of the air pulser 41, with its outlet at the bottom end communicating with a mixing space 44 formed between the powder/granular material inlet of the diffuser 40 and the tip of the air blast cylinder 7 of the air pulser 41.

In the powder/granular material supply device having the abovesaid structure, when pulse air is intermittently blasted into the diffuser 40 from the air blast cylinder 7 of the air pulser 41, powder/granular material flowing into the mixing space 44 from the hopper 42 is fed into the diffuser 40 together with pulse air. The powder/granular material is then discharged from the diffuser 40.

In this embodiment, too, since the air pulser 41, which intermittently blasts pulse air, requires no electromagnetic valve and a control device for controlling the opening and closing of the electromagnetic valve, it is possible to provide a powder supply device which is simple in structure and inexpensive.

Figure 7:
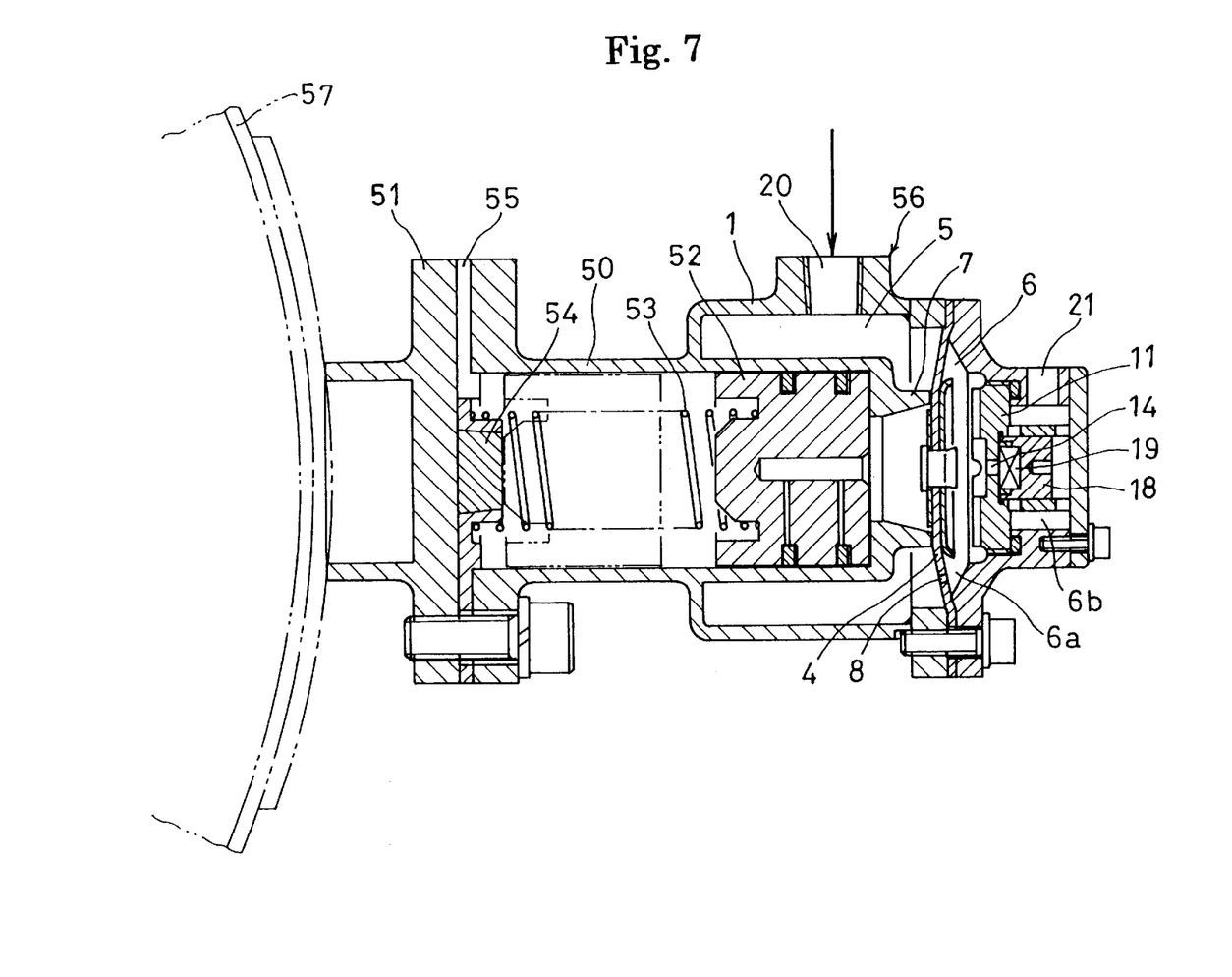
FIG. 7 is a cross-sectional plan view showing the air knocker according to this invention.

FIG. 7 shows one embodiment of the air knocker according to this invention. In a cylinder 50 having the striking plate 51 at its tip, a piston 52 and a return spring 53 biasing the piston 52 in a direction away from the striking plate 51 are mounted. The striking plate 51 is provided with an anvil 54 to be struck by the piston 52.

Also, an air exhaust hole 55 is formed in the tip of the cylinder 50 and and an air pulser 56 is provided at its rear end. The air pulser 56 differs from the air pulser A shown in FIG. 1 only in that the body 1 is formed integral with the cylinder 50 and the air blast cylinder 7 is integral with the rear end of the cylinder 50. Thus, to parts identical or similar to those of the air pulser A, the same numerals are attached and their description is omitted.

In the air knocker having the abovesaid structure, each time pulse air is intermittently blasted into the air blast cylinder 7 from the air pulser 56, the piston 52 advances to strike the anvil 54, so that it is possible to impart vibrations to the striking plate 51.

By mounting the striking plate 51 to the hopper 57, it is possible to intermittently impart vibrations to the hopper 57, thereby suppressing formation of bridges in the powder and granular material filled in the hopper 57. Also, if bridges are formed, it is possible to destroy the bridges.

In this air knocker, too, since the air pulser 56 forms pulse air without using an electromagnetic valve or a control device for controlling the opening and closing of the electromagnetic valve, it is possible to provide an air knocker that is simple in structure and inexpensive.

Figure 8:
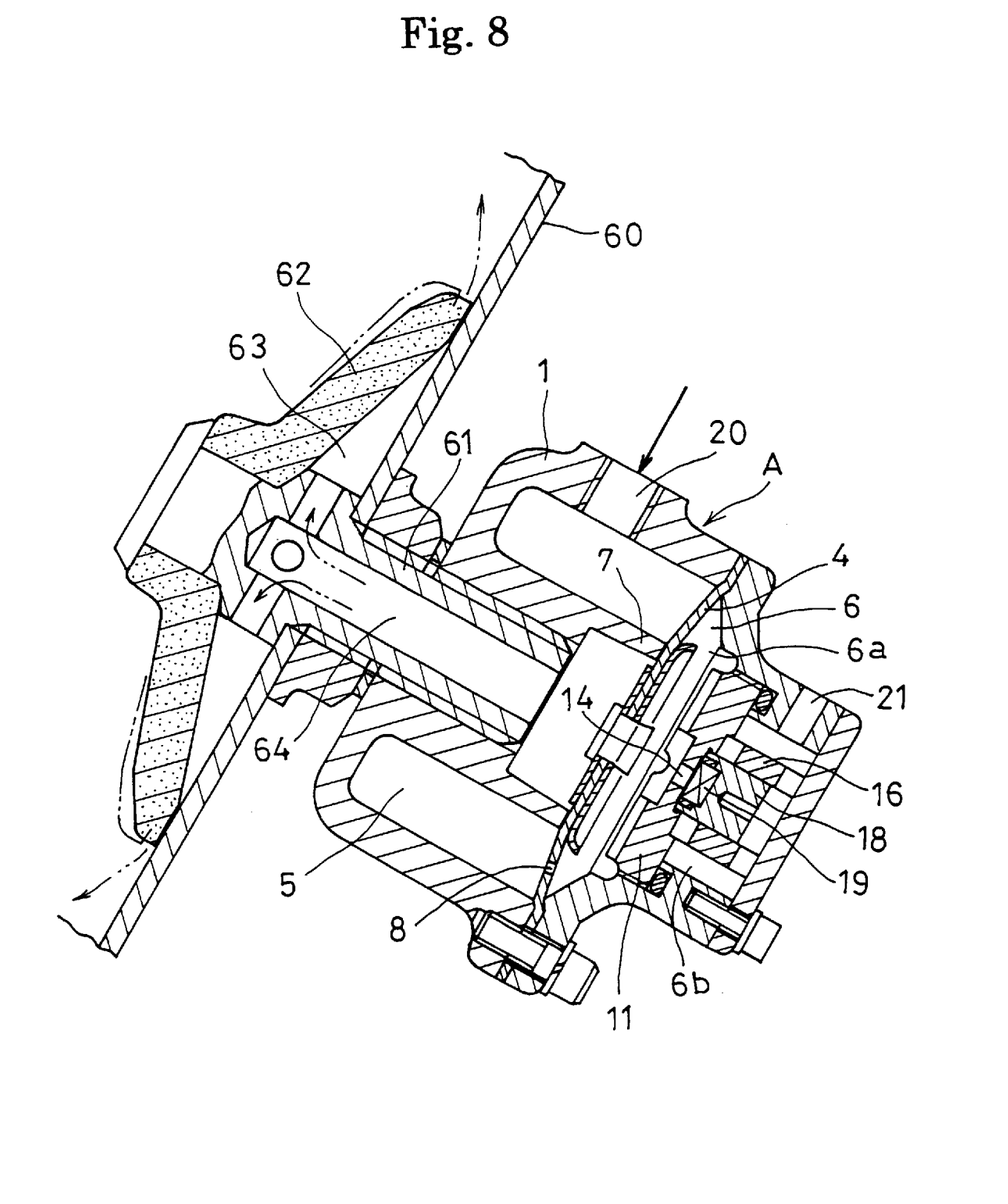
FIG. 8 is a sectional view of one embodiment of the bridge breaker according to this invention.

FIG. 8 shows an embodiment of the bridge breaker according to this invention. In this bridge breaker, an air nozzle 61 is fixed so as to extend through a peripheral wall of a storage tank 60 such as a hopper in which is filled powder and granular material. An umbrella-like elastic member 62 is mounted on the tip of the air nozzle 61 so as to be positioned in the storage tank 60, and the outer peripheral portion of the elastic member 62 is brought into elastic contact with the inner surface of the peripheral wall of the storage tank 60 to provide a space 63.

In the air nozzle 61, an air passage 64 communicating with the space 63 is formed and the air pulser A is connected to the rear end of the air nozzle 61 to intermittently blast pulse air into the air passage 64.

The air pulser A is the air pulser shown in FIG. 1. The air nozzle 61 is connected to the air blast cylinder 7 of the air pulser A by thread engagement.

In the bridge breaker of the abovesaid structure, when pulse air is intermittently blasted into the air passage 64 of the air nozzle 61 from the air pulser A, the pulse air is fed into the space 63, so that the pressure in the space 63 increases. Due to this pressure, the elastic member 62 is elastically deformed in such a direction as to be flattened. Due to such deformation, a gap is formed between the outer peripheral portion of the elastic member 62 and the inner surface of the peripheral wall of the storage tank 60, so that air in the space 63 is blown through the gap into the storage tank 60.

This air blow fluidizes the powder and granular material filled in the storage tank 60. Thus, if bridges are formed, they will be destroyed.

Figure 9:
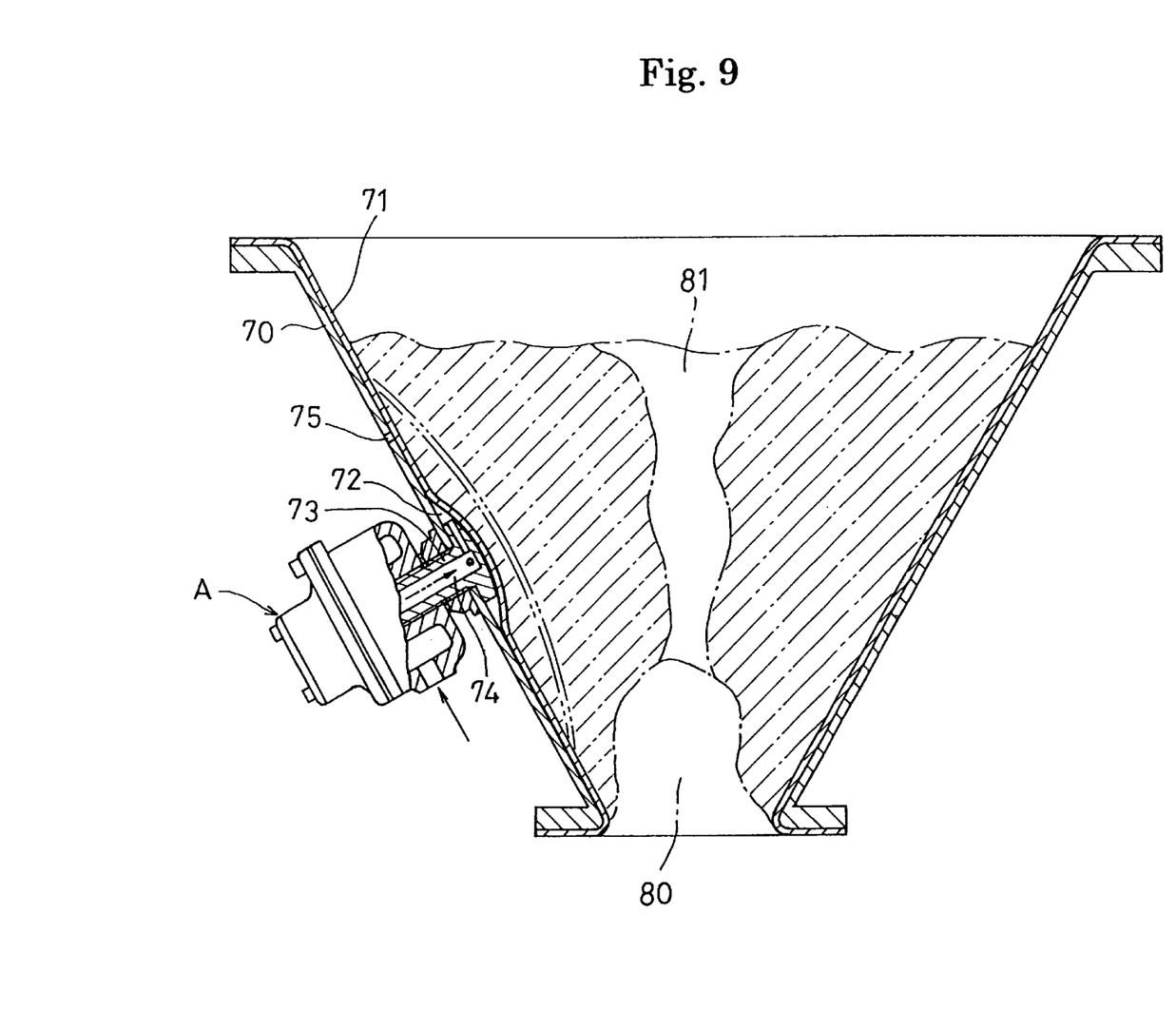
FIG. 9 is a vertical sectional front view showing another embodiment of the bridge breaker according to this invention.

FIG. 9 shows another embodiment of the bridge breaker according to this invention. In this bridge breaker, an elastically deformable elastic sheet 71 is superposed on the inner surface of a storage tank 70 comprising a hopper and fixed. A sealed gap 72 is formed between the elastic sheet 71 and the inner surface of the storage tank 70.

Also, to the storage tank 70, a nozzle cylinder 73 extending through its peripheral wall and having its tip protruding into the sealed gap 72 is fixed. An air passage 74 communicating with the sealed gap 72 is provided in the nozzle cylinder 73. The air pulser A is connected to the rear end of the nozzle cylinder 73 to intermittently blast pulse air into the air passage 74.

The air pulser A is the air pulser shown in FIG. 1. The nozzle cylinder 73 has its rear end connected to the air blast cylinder 7 of the air pulser A by thread engagement.

In the bridge breaker of such a structure, when pulse air is intermittently blasted into the air passage 74 of the nozzle cylinder 73 from the air pulser A, the pulse air is fed into the sealed gap 72, so that the elastic sheet 71 is inflated as shown by chain line in FIG. 9 to press powder and granular material filled in the storage tank 70. Thus, if a bridge 80 or a rat hole 81 is formed in the powder and granular material, it can be destroyed without blasting air into the storage tank 70.

In the peripheral wall of the storage tank 70, air exhaust holes 75 are formed to bring the sealed gap 72 into communication with the outside when the volume of the sealed gap 72 increases due to inflation of the elastic sheet 71. By exhausting air through the air exhaust holes 75, the elastic sheet 71 will not inflate any further, so that when the supply of air is stopped, the elastic sheet 71 will return to a flat state.

In this embodiment, the entire inner surface of the storage tank 70 is covered with the elastic sheet 71. But only part of the inner surface may be covered with the elastic sheet 71 with its outer peripheral portion bonded to the inner surface.

In the bridge breakers shown in FIGS. 8 and 9, since the air pulser A for blasting pulse air requires no electromagnetic valve or a control device for controlling the opening and closing of the electromagnetic valve, a bridge breaker is provided which is simple in structure and inexpensive.

As described above, in the air pulser according to this invention, it is possible to intermittently blast pulse air by continuously supplying compressed air. Thus, an electromagnetic valve and a control device for controlling the opening and closing of the electromagnetic valve are not needed.

Thus, it is possible to simplify the structure of devices using an air pulser and reduce the cost.

What is claimed is:

1. An air pulser comprising a body having an inner space, a diaphragm having a small hole and stretched in said inner space of said body to partition said inner space into an air supply chamber and an air exhaust chamber, said diaphragm being imparted with an elastic force so as to be normally deformed toward said air supply chamber, an air blast cylinder provided in said air supply chamber and closed by said diaphragm and communicating with said air supply chamber when in its open state, a valve plate provided in said air exhaust chamber to partition said air exhaust chamber into a first chamber and a second chamber, said valve plate being formed with a valve hole, a valve body provided in said second chamber to control the opening of said valve hole, and a permanent magnet provided in said second chamber to support said valve body so as to be movable relative to said valve plate and hold said valve body in a closed state by attracting said valve plate to said valve body by a magnetic force, said body being formed with an air supply port for supplying compressed air into said air supply chamber and an air exhaust port for exhausting air in said second chamber to outside.

2. An air knocker comprising a cylinder, a striking plate mounted to one end of said cylinder, a piston mounted in said cylinder, a return spring mounted in said cylinder for biasing said piston away from said striking plate, an air pulser provided at the other end of said cylinder for blasting pulse air into said cylinder, said air pulser comprising a body integral with a rear end of said cylinder and having an inner space, a diaphragm having a small hole and stretched in said inner space of said body to partition said inner space into an air supply chamber and an air exhaust chamber, said diaphragm being imparted with an elastic force so as to be normally deformed toward said air supply chamber, an air blast cylinder provided in said air supply chamber and closed by said diaphragm and communicating with said air supply chamber when in its open state, a valve plate provided in said air exhaust chamber to partition said air exhaust chamber into a first chamber and a second chamber, said valve plate being formed with a valve hole, a valve body provided in said second chamber to control the opening of said valve hole, and a permanent magnet provided in said second chamber to support said valve body so as to be movable relative to said valve plate and hold said valve body in a closed state by attracting said valve plate to said valve body by a magnetic force, said body being formed with an air supply port for supplying compressed air into said air supply chamber and an air exhaust port for exhausting air in said second chamber to outside, said air blast cylinder of said air pulser being integral with said rear end of said cylinder.

* * * * *